July 9, 1946.  R. HAYWARD  2,403,659
APPARATUS FOR SURFACE GENERATION
Filed May 2, 1945  3 Sheets-Sheet 1

INVENTOR
ROGER HAYWARD
ATTORNEYS

Patented July 9, 1946

2,403,659

UNITED STATES PATENT OFFICE 2,403,659

APPARATUS FOR SURFACE GENERATION

Roger Hayward, Pasadena, Calif.

Application May 2, 1945, Serial No. 591,500

19 Claims. (Cl. 51—120)

The invention described herein may be manufactured and used by or for the Government for governmental purposes, without the payment to me of any royalty thereon.

This invention relates to the generation of surfaces such as optical surfaces, and relates more particularly to apparatus for grinding and polishing the surfaces of reflective and refractive bodies to definite predetermined configurations. The invention has been particularly developed for surfaces of generation of correcting plates for the optical system known as the Schmidt camera; and accordingly the invention will be described more particularly with relation to the generation of such correcting plates, but without limitation thereto as the invention is applicable to generation of other surfaces, as will be explained.

The Schmidt camera is well known and needs no detailed description. In essentials, it consists usually of a spheric reflector which is the objective of the instrument, and a thin refractive correction plate placed at the center of curvature of the objective. The correction surface of the plate is usually formed on one face only and, in a diametral section, is a surface of compound curvature.

The Schmidt camera is an extremely useful optical instrument, as it attains good definition over a wide angular field. Production of the Schmidt camera in sufficient quantity to satisfy its widely extended utility, appears to be dependent, among other things, upon production of the correcting plate; and it is an object of this invention, among other things, to provide apparatus for production of the correcting plate.

It has been known for some time that the intersection of two cylindric surfaces with suitably chosen radii will lie substantially in the surface of a Schmidt correcting plate. That fact has been utilized in an apparatus for the generation of Schmidt correcting plate surfaces, proposed by Arthur S. Leonard in a paper which was presented and read at symposium on Schmidt cameras at the Griffith Planetarium, Los Angeles, about 1940. The apparatus proposed by Leonard has certain limitations, mainly due to the fact that it provides only a single moving point which is guided by a linkage system to move in a line representing the intersection of two cylindric surfaces. The abrasive action of the apparatus was therefore limited to the action of abrasive or polishing material carried at that point or on a small surface at that point. The Leonard apparatus also has the disadvantage of requiring a rigid and accurately defined mechanical control and mounting, as the path of the grinding or polishing point does not tend automatically to generate a Schmidt surface except insofar as it is rigidly and mechanically guided.

As applied to the generation of the Schmidt correction surface, or the generation of any other surface which my apparatus is capable of forming, it is among the objects of the invention to provide an apparatus which will perform the work quickly and accurately, which presents to the work a grinding and polishing surface of considerable extent and therefore grinds and polishes rapidly, and in which there is automatic tendency toward formation of the predetermined surface configuration without the necessity of any physical guidance or control other than that afforded the apparatus by the work.

The invention will first be described in a particular and specific form which has been found to be successful for the generation of the Schmidt correcting surface; and then certain other forms and variations of the apparatus, adapting it to different types of surfaces, as will be explained. For those purposes reference is had to the accompanying drawings in which.

Figures 6, 7, 8, 9, 10, 11:
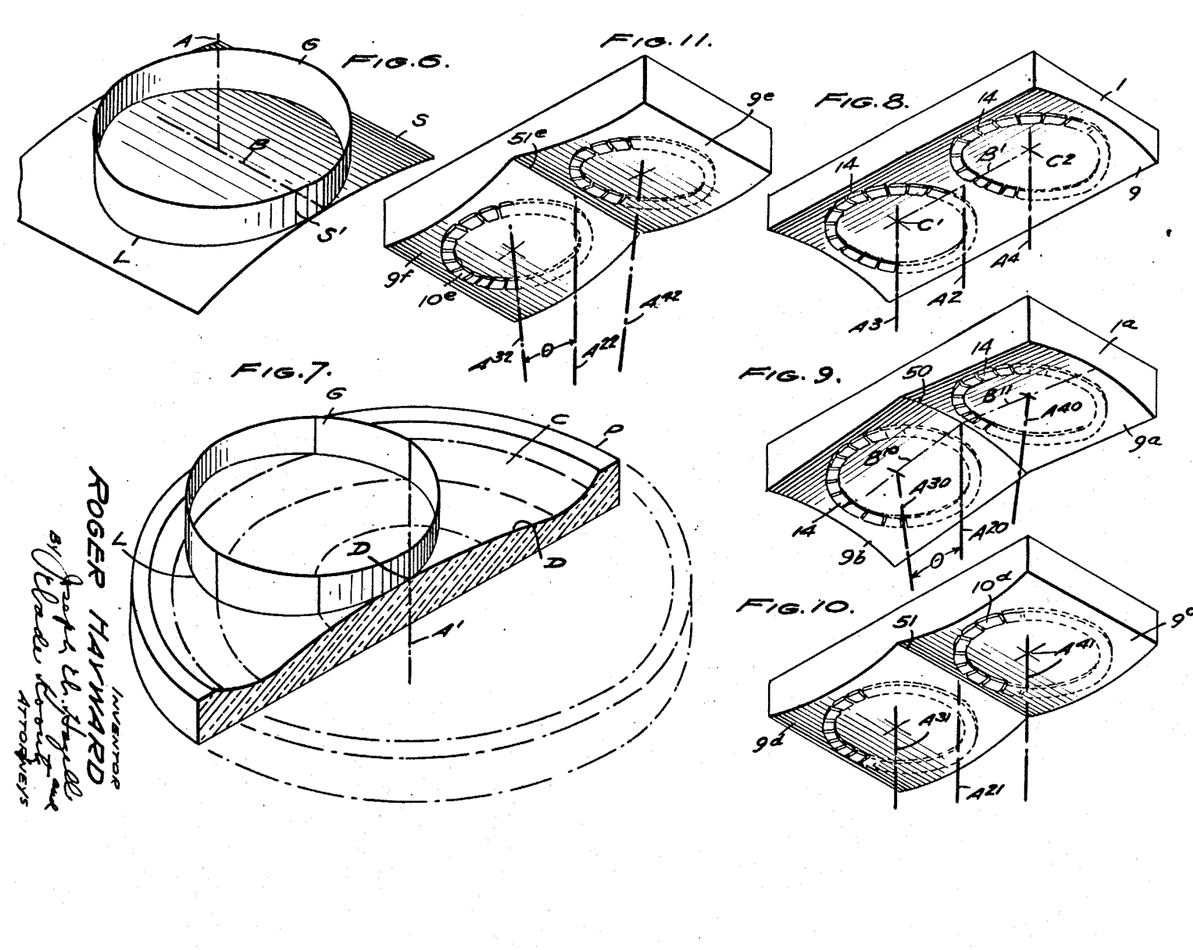
Figs. 6 and 7 are diagrammatic perspectives illustrating the principle upon which the invention is founded.
Figs. 8, 9, 10, and 11 are other diagrammatic perspectives illustrating other forms which the apparatus may take.

I refer first to the diagrammatic showings of Figs. 6 and 7. Fig. 6 shows one cylindric surface S and another cylindric surface S1 whose axis is at right angles to the axis of surface S. The line of intersection of the two surfaces is shown at L.

Fig. 7 shows a typical Schmidt correcting plate P in perspective section. The typical compound curvature of correcting surface C of that plate is shown by the compound curvature of the diametral curved profile D. If one now imagines the cylindric surface S1 of Fig. 6 to be in the physical form of a thin cylindric ring G and assumes that the cylindric radii of the two cylindric surfaces have been properly chosen, if then the ring G is physically placed on correcting surface C in relative position shown in Fig. 7, then the line of cylindric intersection L will lie at all points very closely in correcting surface C. The degree of approximation to which that coincidence is approached will be explained later; it suffices at present to say that intersection line L lies closely enough in a theoretically correct surface C to attain the accuracy of the surface generation which is necessary for many if not all uses of a Schmidt camera. The correct relative placement of ring G on surface C, as shown in Fig. 7 for a particular illustration of the invention, may be defined as follows. In Fig. 6 let the line A represent the axis of cylindric surface S1. Let the line B represent that element of cylindric surface S which axis A intersects. (The axis of cylindric surface S in Fig. 6 would be a line parallel to B but out of the figure below B.) Element B intersects cylindric surface S1 at a point D. In placing ring G on surface C the point D is placed on the axis A1 of correction surface C; that correction surface being a surface of revolution about axis A1. With ring G so placed, intersection line L lies at all points approximately in surface C.

The apparatus of my invention is one which utilizes the principles which have been described in connection with Figs. 6 and 7. A preferred manner in which those principles are utilized, and the primary features of a preferred apparatus, are diagrammatically illustrated in Fig. 8. In that figure a block 1 is illustrated as having a concave cylindric under face 9. A central axis A2 is indicated, at right angles to the cylinder axis of surface 9 (radial to that surface). The cylindric element which is intersected by axis A2 is indicated at B1. On that cylindric element two centers C1 and C2 are indicated, equally and oppositely placed from axis A2. About each center, C1 and C2, a circular annular array of thin grinding or polishing facets 14 is indicated, as if the facets lay in circular arrangement about C1 and C2 and were attached to cylindric surface 9. In other words, if the radial dimension of the facet annulus be considered as small, the facets would lie in the line of intersection of cylindric surface 9 with two cylinders whose axes are indicated at A3 and A4. Those two axes can be here defined as axes which intersect a cylindric element B1, and are at right angles to element B1 and in a plane which is determined by element B1 and the cylindric axis of cylindric surface 9. Central axis A2 may be defined as an axis which lies centrally between axes A3 and A4 and in the same plane. More generally, the arrangement may be described as one in which the two axes A3 and A4 of the grinding arrays are in a single plane with central axis A2 and are disposed symmetrically with relation to both that central axis and the cylindric element B1 which is intersected by the central axis. (The application of the last clause of this definition to a modified form of apparatus will appear later.)

From what has been said, it will be understood that each of the two annular arrays of facets 14 lie substantially in the intersection of two cylindric surfaces such as shown in Fig. 6. The reason for employing two such facet arrays instead of a single one is to obtain a balance in the apparatus which obviates the necessity of utilizing any rigid physical guidance for the apparatus. However certain desirable features of my invention may be attained by utilizing only a single one of such facet arrays and giving a rigid physical guidance to the apparatus so as to compel its rotation as a whole about a relatively fixed axis A2.

Fig. 8 may be considered either as showing facets 14 as if they were attached to surface 9, or as if they were formed on or attached to a pair of thin flexible disks which are axially mounted at center points C1 and C2 on surface 9 and capable of rotation about those centers with the flexible disks following the guide surface. The latter is true of the practical form of apparatus which is shown in Figs. 1 to 5. In theory, the flexure of the disk prevents its periphery from exactly following the theoretically correct cylindric surface S1 of Fig. 6, or of following a truly circular path in plan; but the discrepancy is so slight as to be negligible.

In Figs. 1 to 5 the guide block 1 is shown as having a lower cylindric face 9. As illustrated, but not necessary, there is a bearing block 16 attached to the upper face of the guide block, as by screws 17. A handle or operating shank 2 is connected with block 16 through the medium of a ball-and-socket joint 3b and 15, the joint, and shank 2 in practice, being located on an axis A2 which corresponds with the axis A2 of Fig. 8. The shank 2 provides a convenient means through which guide block 1 may be properly positioned with reference to the work piece 8, about the center of which the guide block may rotate, and which may be utilized to give the guide block and the whole grinding apparatus any suitable or desired movement in a horizontal plane with relation to the work. A pin 18 set in block 16 and projecting over ball 3b prevents the ball from lifting out of the socket 15 so that the whole apparatus can be lifted by lifting shank 2.

Figure 1:
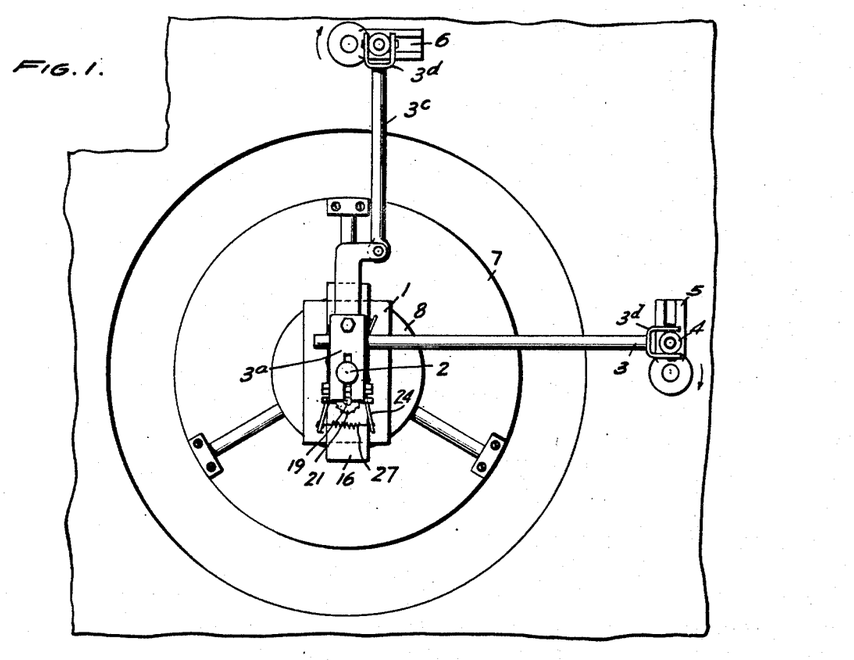
Fig. 1 is a top plan view showing parts of a typical grinding machine with my improved surface generating apparatus applied thereto.
Figure 2:
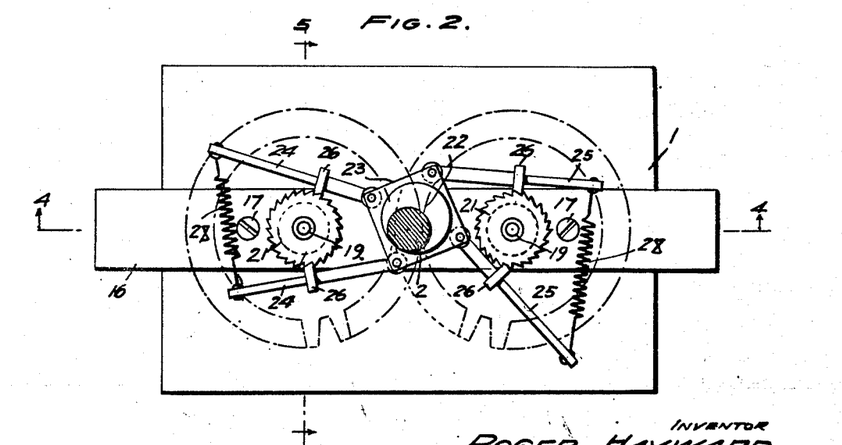
Fig. 2 is an enlarged top plan of my improved apparatus.
Figure 3:
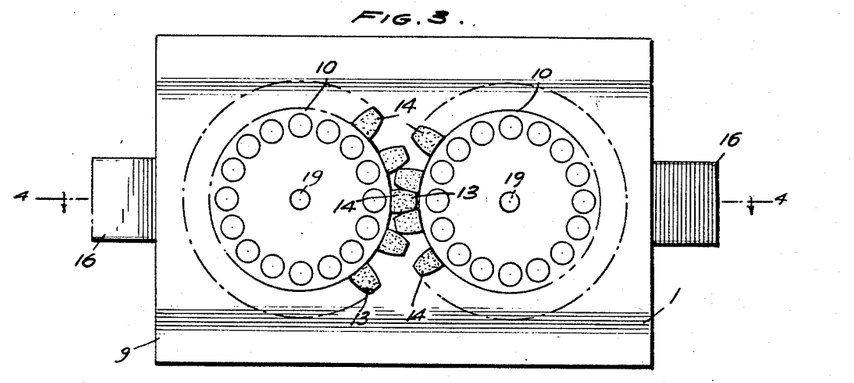
Fig. 3 is a bottom plan of the apparatus shown in Fig. 2.

As shown in Fig. 1 shank 2 is held nonrotatively in a clamp member 3a, and clamp 3a is connected by an actuating or guiding arm 3 with an adjustable crank pin 4 of crank 5 which is driven at a uniform and relatively slow speed by a mechanism of the grinding machine (not shown). Similarly the clamp 3a may be connected by another actuating arc 3c with another crank 6 of the grinding machine. These two connections suffice both to fix the axis of shank 2 horizontally with reference to the work and to give the whole apparatus a small horizontal oscillative movement which is conducive to fast grinding and polishing. The confining functions of these two connections are, however, limited to confinement of the apparatus in a horizontal direction; the actuating arms 3 and 3c contain universal connections 3d which will leave the apparatus free to move in a vertical direction without any constraint.

Work piece 8, typically a piece of glass, is mounted on the rotatable turntable 7 of the grinding machine, and rotated by the mechanism of the machine (not shown). The axis A2 of shank 2 is, in its median or normal position, coincident with the vertical axis of turntable shaft 7a, so that the axis about which guide block 1 rotates is, generally speaking, coincident with the axis about which work 8 is rotated.

Figure 4:
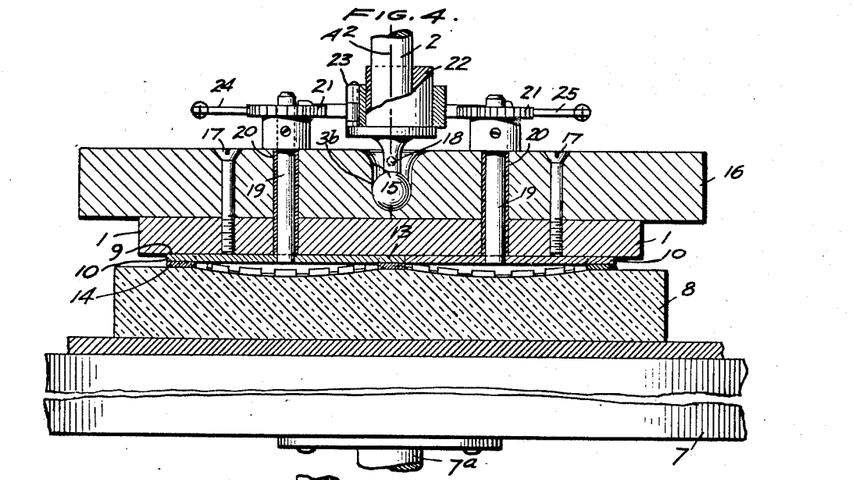
Fig. 4 is a vertical longitudinal section taken approximately on the plane indicated by line 4—4 in Fig. 2.

Equally spaced from the rotative axis of A2 guide block 1 and disposed on axes which correspond in location with the axes A3 and A4 of Fig. 8, as previously described, are two relatively thin and flexible grinding disks 10. (To assist in co-relating Fig. 4 with Fig. 8, it will be remembered that Fig. 4 is a central section taken longitudinally through the cylindric surface 9, the plane of the section of Fig. 4 being a plane which passes through the axis of that cylindric surface.) The peripheral edge portions of these thin grinding disks, or a series of peripherally arranged grinding facets 14, are in contact with the upper face of work piece 8 and are pressed toward cylindric surface 9 by the pressure exerted upon them by the work. Each flexible grinding disk is rigidly mounted upon the lower end of a shaft 19, those shafts being carried in suitable bushed bearings 20 which extend through guide block 1 and bearing block 16 on axes which are located in the positions which have been described for A3 and A4 in connection with Fig. 8.

As shown in the drawings, the grinding disks 10 are driven and are intergeared together. They are provided with peripheral inter-meshing gear teeth formations 13 (see Fig. 3) upon the lower faces of which the grinding or polishing facets 14 are mounted. The two rings of grinding facets thus overlap each other in their action. That overlapping is in some cases desirable, but not necessary.

Any suitable means for driving the two grinding disks rotatively with reference to guide surface 9 may be used; a simple and suitable arrangement being shown in the drawings. The ends of shafts 19 projecting above block 16 have ratchet wheels 21 secured to them. Shank 2 carries a fixed eccentric or cam 22 and an eccentric strap or block 23 surrounds eccentric 22. Two pairs of ratchet actuating arms 24 and 25 are pivoted at the corners of block 23 and project in the directions shown in Fig. 2 with the arms of each pair lying at opposite sides of a ratchet 21. The ratchet teeth of the two ratchets are arranged to face in opposite directions, and ratchet actuating pawls 26 are mounted on the several arms 24 and 25. Tension springs 28, or any other suitable means, connect the ends of the pairs of arms 24 and 25 together, urging the ratchet pawls toward the ratchet disks.

Preferably, although this is not necessary, the hubs of ratchets 21 (see Figs. 4 and 5) are rigidly set on disk shafts 19 in such a longitudinal position as to pull the centers of disks 10 up against cylindric guide face 9. As will be understood from the following description of operation, the upward pressure of the work on the peripheries of the disks will tend to press their peripheries into continuous contact with cylindric guide face 9; but it is preferable to hold the centers of the disks up against that guide face not only to keep the disk centers clear of the work but also to make the disk peripheries continuously follow the cylindric guide surface without necessarily utilizing the upward pressure of the work for that purpose. For similar reasons the thin disks, in practice, have some resiliency, although it is only necessary that they be flexible.

Figure 5:
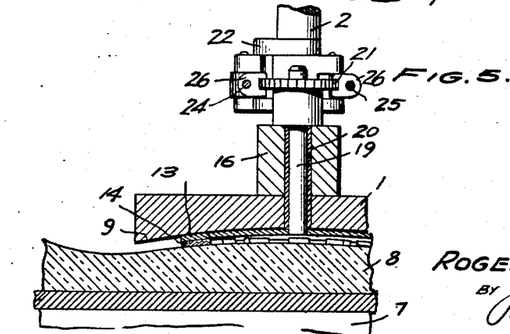
Fig. 5 is a fragmentary vertical cross section taken approximately on the plane indicated by line 5—5 in Fig. 2.

It will be noted that the annular arrays of grinding facets 14 as shown here have a considerable radial dimension; and to the extent of their radial dimensions they depart from the theoretic intersection line L of two cylindric surfaces such as shown in Fig. 6. I have found however that the grinding facets may have radial extents of about the proportional dimensions shown in the drawings without causing their grinding and polishing operations to depart to any serious degree from the theoretic surface desired to be generated. And it will be noted that the thin disks 10 and the grinding facets 14 have some appreciable thickness. The proportionate thickness of disks 10 is shown somewhat exaggeratedly in the drawings, for clarity of illustration. But the total thickness of the disks and facets may be substantial and in about the proportions shown in the drawings, without interfering seriously with the generation of the theoretically required surface. Except for a very small variation which is the result of the facets having some radial extent and of their being tilted, so to speak, as shown in Fig. 5 in certain parts of their travel, all points on the lower faces of the facets follow a line of travel which is accurately parallel to the line of intersection L of Fig. 6.

Assuming that the work is being rotated by the grinding machine, the whole grinding apparatus will rotate with the work unless it is held from rotation, or unless its rotation is retarded. If the apparatus simply be held stationary or retarded in rotation, there will be relative rotary movement between the work and the grinding facets, but, without some provision for driving the flexible disks there will be no rotation of the grinding facets with reference to cylindric guide face 9. With the disks intergeared, the frictional drag of the work on the two disks will be balanced and cause no rotation. And even if the disks are not intergeared, but are free to rotate, the disks in practice will not rotate with reference to the guide surface with any reliability, without at least some special provision for lubrication between the disks and the guide surface. Generally speaking, the action of the mechanism without any means for driving the disks, or with the disks stationary with reference to the guide surface, would be as if the grinding facets were attached to the guide surface as has been mentioned in connection with Fig. 8. And in that case the grinding facets which are further removed from central axis A2 would wear faster than those nearer that axis and the required surface figure could not be obtained.

Thus, it is preferable, although it may not be absolutely necessary, to provide a means for positively driving the disks with reference to the guide surface; and that desirable function is performed, together with the function of retarding the rotation of the whole apparatus, by such a mechanism as has been described. The operation of that mechanism is as follows.

The whole apparatus tends to rotate with the work about central axis A2. Mandrel 2 being held stationary, eccentric strap 23 rotates about the relatively stationary eccentric 22. That relative rotation reciprocates the eccentric strap once for each revolution of the apparatus; and pawls 26 act on ratchets 21 to slowly step the flexible disks around with reference to the guide surface as the whole apparatus rotates. The two disks are stepped around in opposite directions and by equal amounts, and their intergearing keeps them rotating equally and oppositely. And, as mentioned before, the intergearing enables the action of the two sets of facets to mutually overlap.

The energy required for rotating the disks is taken from the rotating apparatus, and the reaction forces thus applied to the apparatus have the effect of materially retarding the rotation of the apparatus and thereby causing a relative rotation between the work and the apparatus as a whole. Consequently the disks, relative to the work, have a planetary motion which causes them to revolve about central axis A2, over the whole surface of revolution on the work, and at the same time causes them to rotate about their own axes so as to equally distribute the wear on the grinding facets. Grinding wear being thus equalized, the apparatus, without any special guidance other than the location of its central axis A2, and under a vertical pressure which may be merely its own weight, or applied weight or other force, grinds into the work until the whole required figure is produced.

Grinding and polishing of a surface may be accomplished with the apparatus axis A2 held coincident with the axis of the work. But grinding and polishing speed is much increased by giving the apparatus axis a small reciprocatory or oscillatory movement with reference to the work axis; and that is accomplished in the ordinary manner and as has been described in connection with Fig. 1. The same movements, and the holding of mandrel 2, may of course be accomplished manually. Within reasonable limits the oscillation of the axis A2 very much increases the speed of removing material from the work surface, and does not materially affect the accuracy of the surface which is formed.

For the foregoing description of operation it is said that the whole apparatus rotates about axis A2, which is true despite the fact that the orientation of that axis with reference to the guide surface 9 is not rigidly fixed. In the actual apparatus the only axial point which is fixed is the point at the center of ball joint 3b. The balanced nature of the apparatus and of the reaction pressures from the work automatically establish the orientation of axis A2 along a line radial of the cylindric curvature of guide surface 9. The result is just as if the guide block 1 were rigidly constrained to rotate about a fixed axis A2, and in fact it can be so mounted without changing the operation in any particular. Such rigid axial mounting is however not necessary unless an unbalanced arrangement of a disk or disks is used.

I have said that the intersection of two circularly cylindric surfaces lies very closely in a theoretically perfect surface of a Schmidt correcting plate. Within the limits of that approximation, in order to grind and polish any given Schmidt correcting plate it is only necessary to choose the radii of the two intersecting cylinders; the radius of cylindrical guide surface 9 and the effective or median radius of the grinding facets (or, what amounts to the same thing, the effective radius of a grinding annulus carried by the disk). In order to enable others to practice my invention with facility I give the following information.

The formula which expresses the diametral profile curve of a Schmidt correcting plate in terms of objective dimensions is one which involves a series of terms of increasingly higher order and increasingly lesser value. The first two terms of such a formula are as follows:

(1) $$X = \frac{ky^2r^2 - y^4}{4(n-1)R^3}$$

where X is the depth of the profile curve at a radius $y$ from the center of the plate; $r$ is the radius of the outside margin of the effective figured surface of the plate; R is the radius of curvature of the primary mirror of the Schmidt combination; $k$ is a constant which in Formula 1, for the type of apparatus here being described, is unity or greater. The value of $k$ determines the radius of the deepest part of the profile of the plate—that is, the radius of the neutral zone of the plate. "$n$" is the index of refraction of the glass.

In terms of that formula, the formulae for the radii of the two intersecting cylinders, in the apparatus form under discussion, are as follows:

(2) $$r_G = \frac{r}{2}\sqrt{K}$$

(3) $$r_S = \frac{2(n-1)R^3}{kr^2}$$

Where $r_G$ is the radius of the theoretic cylinder G (Figs. 6 and 7) or the mean radius of the grinding annulus 14 of the disk 10, or the pitch radius of their teeth; and where $r_S$ is the radius of cross-sectional curvature of the cylindric guide surface S or 9.

The intersection of cylinders whose radii are fixed by the foregoing formulae will satisfy the Schmidt correction plate formula through the second term. If a closer approximation to the Schmidt formula is desired, to include the succeeding term or terms, the guide surface 9 becomes one of higher order curvature—having different curvatures in two right-angles directions, but the curvature which we here call cross-sectional is or may be still circular or very closely so. The term "cylindric surface" as here used is intended to include such variations from a circular cylinder with straight elements.

Generally speaking, the cross sectional form of the guide surface, as well as the curvature of its elements, may be any curve which may be suited for the generation of any desired surface other than the specific Schmidt surface which is here being used as an illustration. The invention is not necessarily limited to the generation of the Schmidt correction surface. The term "cylindric surface" as here used is also intended to include such formations.

Everything else remaining the same, if the effective radius of the cylindric guide surface be increased, the depth of the surface curve on the work decreases until, at infinite radius of the guide surface (guide surface flat) the generated surface becomes a flat. If one then proceeds to reverse the guide surface curvature to make it convex instead of concave (the radius becoming a negative quantity instead of positive in Formula 3) the resulting generated surface is relatively reversed from that shown in Fig. 7 and has the contour of a Schmidt correcting plate of the reflecting type rather than of the refracting type.

It is not necessary that the cylindric elements of the guide surface be straight. Further variation in the contour of the surface generated may be had by employing what may be termed a warped cylinder—one whose cylindric elements are curved rather than straight. And, for instance, if the cylindric elements be warped to a curvature and radius equal to the cross-sectional curvature and radius, a spheric surface will be generated.

Further modifications which are illustrative of the invention are shown in Figs. 8, 9, 10, and 11. Fig. 8 illustrates diagrammatically two circular arrays of facets which do not intersect each other but are spaced apart. Everything else being the same, if the two axes A3 and A4 of the two grinding disks are spaced further apart, as Fig. 8 indicates, the neutral zone of the generated Schmidt surface is increased in diameter.

Fig. 9 shows another modification in which the guiding surface on the block 1a is formed of two angularly disposed and intersecting cylindric surfaces 9a and 9b. The two angularly disposed axis (not shown) of these two cylindric surfaces intersect the central axis A20 which corresponds to axis A2, and the two cylindric surfaces intersect along a line 50 which intersects axis A20. Axes A30 and A40 of the two sets of grinding facets 14 and their rotatable disks lie in the plane determined by central axis A20 and the cylinder axes. The axes A30 and A40 are at right angles to the two cylindric elements B10 and B11 which intersect at the point where A20 intersects 50. This modification of the apparatus may be regarded as one in which the grinding disk axes A30 and A40 are still at right angles to a common cylindric element which is deformed angularly centrally between the two axes—that is, deformed symmetrically about axis A20. The surface generated by this form of apparatus is similar to that before described but with a shift of the neutral zone of the Schmidt surface. The same general definition may be applied to this form. The two axes A30 and A40 are symmetrically arranged with relation to central axis A20 and with reference to the cylindric element (the warped or deformed element B10, B11) which A20 intersects.

Fig. 10 shows a further illustrative variation of the invention wherein the curved guide surface is made up of two convex surfaces 9c and 9d here illustrated as two cylindric surfaces on parallel axes and having parallel straight elements and equal radii, and intersecting each other on a common element 51 which intersects the central rotational axis A21. The two faceted disks 10d are mounted on axes A31 and A41 which are parallel to axis A21 and are radial to the two cylindric surfaces 9c and 9d. In this form, with two circularly cylindric convex surfaces, a normal Schmidt correction surface is produced (Fig. 7); if the surfaces are concave a reverse or negative Schmidt surface is produced.

Fig. 11 shows a further modification which bears the same analogy to Fig. 10 that Fig. 9 bears to Fig. 8. In Fig. 11 the two cylindric surfaces 9e and 9f are of equal radii and have parallel axes and parallel elements, intersecting on the common element 51e. The two grinding disks 10e, however, lie on axes A31 and A42 which are not parallel as in Fig. 10 but make equal angles with central axis A22. Like axes A31 and A41 of Fig. 10, the axes A32 and A42 lie in a single plane with axis A21 and are symmetric with respect to that central axis. And in both Figs. 10 and 11 the two axes of the grinding disks are disposed symmetrically with reference to the element 51 or 51e which axis A21 or A22 intersects.

More generalized formulae for the radii of the two intersecting cylindric surfaces, to include the variations illustrated in Figs. 8 to 11, are as follows:

(4) $$r_G = \sqrt{\frac{kr^2 - 2J^2 + r_S J \tan \theta}{2}}$$

(5) $$r_S = \frac{2(n-1)R^2}{J^2}$$

where $J$ is the distance of the grinding disk center from the central axis, and $\theta$ is the angle between the disk axis and the central axis. These formulae are only accurate where $\theta$ is small.

In Formulae 4 and 5, if $J$ is equal to $r_G$ (spacing equal to the grinding disk radius) and $\theta$ is equal to zero, Formulae 4 and 5 reduce to 2 and 3 and we have the apparatus form of Figs. 1, 5 and 8. In that form where the constant $k$ has been taken as unity, the radius of the neutral zone (deepest zone) of the Schmidt surface is equal to $$r_G \sqrt{2}$$

In such forms as shown in Figs. 9 and 11, the constant $k$ can be less than unity or even a negative quantity.

In any such forms as shown in Figs. 9 and 11, the angle $\theta$ can be either plus or minus. Thus, in Fig. 9 the warped angular relation between the cylindric guide surfaces 9a and 9b may be reversed so that the grinding axes A30 and A40 will intersect central axis A20 above instead of below. And in Fig. 11, a shift of the two grinding centers outwardly away from A22 will first bring A32 and A42 into parallelism (Fig. 10) and then reverse the angular relation of the grinding axes A32 and A42 with relation to A22.

It may be noted that the foregoing discussions of the invention, including the mathematical treatments, have assumed that central rotational axis and the axes about which the grinding disks rotate are in every case perpendicular to the guide surface (radial to the guide surface curvature) at the points of axis intersection with that surface. That will always be true of the central rotational axis in any apparatus utilizing a pair of symmetrically placed grinding disks, because the curvature of the guide surface must in that instance be symmetric with reference to the central axis. But in apparatus where the cylindric curvature or curvatures of the guide surface are non-circular, the rotational axes of the grinding disks will not be truly radial to the surface curvatures, although in most instances they will be substantially radial. The actual axis of rotation of a disk is fixed, in orientation with reference to the guide surface, by the shape of that surface around the physically fixed center of the disk—not necessarily by the orientation of the axis spindle (e. g. spindle 19 of Figs. 4 and 5). The primary purpose of the physical spindle is simply to fix the disk axis at the desired point on the guiding surface.

Having thus described my invention, what I claim as new, and desire to secure by Letters Patent is:

1. In surface generation apparatus of the class described, a support relatively rotatable about a predetermined axis with respect to a surface to be generated, said support having a guide surface formed thereon facing the surface to be generated, a flexible surface generation member rotatable with respect to the support in guiding contact with said guide surface to follow the contour of said guiding surface about an axis eccentric with respect to the axis of relative rotation of the support, and surface generation means carried by said surface generation member in spaced relation to its rotational axis, to describe a substantially circular path adjacent to and equally spaced from said guiding surface throughout the rotation of said flexible surface generation member on the support and during the relative rotation of the support on its axis with respect to the surface to be generated.

2. In a curved surface generation apparatus, a surface generation head adapted to be relatively rotatably disposed above the surface to be generated on an axis perpendicular to the surface to be generated, said head having a curved guiding surface facing the surface to be generated, a flexible surface generation member rotatable on the head in juxtaposed guiding relation with respect to said curved guiding surface to follow the contour of said curved guiding surface about an axis eccentric to the axis of relative rotation of the head, in a plane parallel to and passing through the axis of rotation of the head, and surface generation means secured to said surface generation member in spaced relation to its rotary axis for engagement with the surface to be generated.

3. In a grinding and polishing apparatus for surface generation, a head having a guiding surface adapted to face the surface to be generated, a flexible member rotatably mounted on said head to move in a circular path in guiding relation with said guiding surface to follow the contour thereof upon relative rotation between the flexible member and said head, grinding and polishing means secured to said flexible member in spaced relation to the axis of rotation of the resilient member for engagement with the surface to be ground and polished.

4. In lens grinding and polishing apparatus of the class described, a surface generation head adapted to be rotatably mounted with respect to the surface of the work to be generated, on an axis substantially perpendicular to the surface to be generated, said head having a curved guide surface adapted to face said surface to be generated, a substantially circular thin flexible grinding member rotatably mounted on said head in guiding relation with said curved guiding surface to follow the contour of said curved guiding surface about an axis disposed in a plane passing through the axis of rotation of the head.

5. In a rotary surface generation apparatus for developing a compound curved surface of revolution, a work surface generation head adapted to be mounted for relative rotation on an axis passing through said surface to be generated in substantially perpendicular relation thereto, said head having a cylindric guide surface facing the surface to be generated and having an axis intersecting the axis of rotation of the head, an annular flexible member rotatably mounted on the head, having one face thereof disposed in guiding relation with said cylindric guide surface, said flexible member having an axis of rotation spaced from the rotational axis of the head in intersecting relation to the axis of the cylindric guide surface, and surface developing means carried by said annular flexible member on the opposite face thereof adjacent its periphery for surface developing engagement with said work surface.

6. In a surface generation apparatus for developing a compound curved surface of revolution having a surface in which a line formed by the intersection of two cylindrical surfaces whose axes intersect each other will lie, a surface developing head having a cylindrically curved guiding surface adapted to face the surface to be developed, having a curvature conforming to the curvature of one of said intersecting cylindrical surfaces, a flexible surface development member rotatably disposed on said head in guiding relation with said cylindrically curved guiding surface on an axis intersecting the axis of the cylindrically curved guiding surface and having a substantially circular path of rotation on said guide surface equal to the curvature of the other intersecting cylindrical surface, means for causing relative rotation of said head with respect to the surface to be developed, and means for causing relative rotation of said flexible development member on its axis in the head.

7. In a lens grinding machine of the class described having a work support adapted to carry a work blank, the surface of which is to be developed to a specific contour, a surface grinding and figuring head therefor movable into surface developing engagement with the surface of the blank, means for effecting relative rotation between said work surface and said head, said head comprising a bearing block having a cylindric guide surface thereon adapted to face the work having an axis of curvature intersecting the axis of relative rotation of said figuring head, rotary surface figuring means having an axis of rotation disposed in a plane parallel to the axis of relative rotation of the head and intersecting the axis of said cylindric guide surface, said rotary surface figuring means comprising a thin flexible circular member pivoted at its center on the head to rotate in guiding contact against said cylindric guide surface and having surface grinding means disposed thereon around its peripheral portion for engagement with the surface of the work to be figured.

8. A surface grinding and figuring head of the class described for developing a compound curved surface of revolution, adapted to be used with a conventional rotary lens grinding machine, said head having means at one side for swivelly connecting the same to a controlling arm of the grinding machine, and formed with a cylindrically curved guiding surface at its opposite side adapted to face the surface to be figured, a flat flexible rotary grinding member having an axis of rotation disposed perpendicular to said curved guiding surface in laterally offset relation to said swivel connecting means, with its periphery disposed in guiding relation with said cylindrically curved guiding surface, a plurality of surface grinding and figuring elements uniformly spaced around the periphery of said grinding member and facing outwardly away from said cylindrically curved guide surface for engagement with the surface of the work to be figured.

9. A head for grinding and polishing a compound curved surface of revolution comprising a guide block body adapted to be mounted on a grinding arm of a conventional lens grinding machine for tiltable and relatively rotatable movements about a center above the central portion of the surface to be figured, said body having a cylindrically curved guide surface adapted to face the work and having a cylindric axis disposed perpendicular to the rotational axis of the head, rotary grinding and polishing means disposed on said guide surface to move in a substantially circular path about an axis substantially perpendicular to the guide surface in offset parallel relation to said rotational axis of the head, and means for causing rotation of said grinding and polishing means incident to rotational movement of said head about its axis.

10. A compound curved surface developing head having a central axis of rotation adapted to be disposed substantially perpendicular to the surface of the work to be developed, to rotate relative to the surface to be developed with respect to said central axis, said head having a cylindric guide surface with its cylindric axis perpendicular to said first-mentioned axis, rotary surface developing means mounted on said head to move in a substantially circular orbit in grinding relation to the work on said cylindric guide surface about a center disposed on a line substantially perpendicular to the guide surface, said center line lying in a plane passing through the axis of relative rotation of the head with respect to the surface to be developed and spaced from said last-mentioned axis substantially the radius of said circular orbit.

11. In surface generation apparatus having a work support adapted to mount a work piece having a work surface to be developed, an arm for supporting a surface generating head on the work surface for lateral oscillatory displacement and for relative rotary movement about an axis substantially perpendicular to the work surface, means for causing rotation of said work relative to said head about an axis perpendicular to said work surface, said head comprising a body having a cylindrically curved guide surface facing the work surface with its cylindric axis disposed in a plane perpendicular to said axis, a plurality of rotary flexible grinding discs having their centers equally spaced from the rotary axis of the head in opposite directions in a plane passing through the rotational axis of the head, said discs each having surface generation grinding peripheral portions adapted for grinding engagement with said work surface to be developed and movable in juxtaposed circular paths at opposite sides of the rotational center of the grinding head.

12. In a rotary grinding head for lens surface grinding and figuring apparatus, having an axis of relative rotation substantially perpendicular with respect to the surface to be ground, a body having a cylindric guiding surface with its cylindric axis disposed in a plane passing through the axis of rotation of said head with equal portions of said cylindric guiding surface extending equally in opposite directions from said plane, flexible rotary grinding discs disposed with their centers of rotation in said plane in equally spaced relation from said rotational axis of the head with their peripheral portions in juxtaposed relation to each other at the rotational axis of the head, in guiding engagement with said cylindric guiding surface to cause their peripheries to follow the curvature of the cylindric guiding surface, and grinding means carried by the peripheral portions of said discs on the sides thereof facing away from said guiding surface, for surface developing engagement with the work to be ground and figured.

13. Apparatus as claimed in claim 12, including means for causing uniform rotation of said discs while in contact with said guiding surface and the work, comprising a central support for connecting the head for universal tilting and rotary movement to a lens grinding and figuring arm and adapted to be fixedly secured thereto, and mechanical means between said central support and said discs for rotating said discs incident to relative rotation between said central support and said grinding head.

14. In apparatus for developing the surface contour of a Schmidt telescope and camera correction plate, which surface will substantially include a line formed by the intersection of two cylindric surfaces having their axes intersecting each other, a surface developing head comprising a body having an axis of relative rotation with respect to the plate substantially concentric with the central portion of the plate and perpendicular to the surface of the plate, said body having a cylindric guide surface adapted to face the correction plate and having a curvature equal to the curvature of one of the first-mentioned intersecting cylindric surfaces, with an axis-determined cylindric element disposed in a plane perpendicular to the axis of relative rotation of the head, a plurality of flexible surface developing members rotatably disposed on the cylindric guide surface in guiding relation therewith about axes equally spaced from the axis of relative rotation of the head with their centers disposed on said cylindric element of the cylindric guide surface and their peripheral portions disposed in juxtaposed relation to each other at the axis of relative rotation of the body, each of said rotary developing members having similar surface development engaging members for surface developing engagement with the plate, equally spaced around the peripheral portions thereof at a radius substantially equal to the radius of curvature of the other first-mentioned intersecting cylindric surface, said surface development engaging members being rotatable in equally spaced relation to the cylindric guide surface in circular orbits with their centers on axes perpendicular to the cylindric guide surface and lying in said cylindric element of the cylindric guide surface.

15. In a surface generation apparatus of the class described, a body having a cylindric guide surface adapted to face the work surface to be generated, having a radial rotational axis making equal angles with the axis of the cylindric guide surface, and surface generation means rotatably disposed on the guide surface in guiding relation therewith, having an axis of rotation disposed in a plane determined by the body rotational axis and the cylindric axis, said rotary surface generation means comprising a plurality of circular thin flat flexible members each having their peripheral portions at one side disposed in guiding contact with the guide surface, surface generation means uniformly disposed around the peripheral portions of the flexible members at the other side for engagement with the work surface to be generated, and means at the center of rotation of the flexible members for rotatably securing the same to the body eccentrically and symmetrically with respect to the rotational axis of the body.

16. In a surface generation apparatus of the class described, a body having a cylindric guide surface adapted to face the work surface to be generated, having a rotational axis making equal angles with the axis of the cylindric guide surface, and surface generation means rotatably disposed on the guide surface in guiding relation therewith, having an axis of rotation disposed in a plane determined by the body rotational axis and the cylindric axis, said rotary surface generation means comprising a plurality of circular thin flat flexible members each having their peripheral portions at one side disposed in guiding contact with the guide surface, surface generation means uniformly disposed around the peripheral portions of the flexible members at the other side for engagement with the work surface to be generated, means at the center of rotation of the flexible members for rotatably securing the same to the body eccentrically and symmerically with respect to the rotational axis of the body, a relatively stationary pivotal support for connection with the body at its rotational axis having a cam member carried thereby, and means for rotating said surface generation means by said cam member.

17. Apparatus as claimed in claim 16 in which the means for rotating the surface generation members from said cam member comprises operating shafts carrying the circular flexible surface generation members fixed thereto and rotatably mounted in the head, each shaft having a ratchet wheel secured thereto, and ratchet means operable by said cam means incident to relative rotation between the stationary pivotal support and the body to reciprocate in engagement with said ratchet wheel to effect rotation thereof.

18. In a lens grinding head, a body having a cylindric guide surface adapted to face the work to be ground and having a rotational axis making equal angles with the axis of the cylindric guide surface, a pair of interengaging disc-shaped thin flexible surface grinding members, each having a rotational axis disposed in equally spaced relation from the rotational axis of the cylindric guide surface, on an element along the guide surface determined by the body axis of rotation, said grinding members each having one face of its peripheral portion disposed for guiding engagement with the cylindric guide surface, and similar grinding elements equally disposed on the opposite face of each grinding member about the peripheral portions thereof for grinding engagement with the surface to be ground.

19. In a lens grinding head of the class described, a body having a cylindric guide surface adapted to face the surface of the work to be ground and having a rotational axis making equal angles with the longitudinal axis of the cylindric guide surface, a plurality of flexible rotary grinding wheels disposed in equally spaced opposition to the rotational axis of the guide surface, on independent rotational axes perpendicular to the longitudinal axis of the cylindric guide surface in a plane determined by the cylindric axis and the body axis of rotation, with their peripheral portions interengaging each other and in guiding engagement with the cylindric guide surface, surface grinding facets secured to the peripheral engaging portions of the grinding wheels for engagement with the surface to be ground, and means for positively rotating said grinding wheels on their rotational axes incident to rotation of the guiding surface and body about its axis of rotation.

ROGER HAYWARD.